United States Patent
Gregory

[11] 3,852,180
[45] Dec. 3, 1974

[54] APPARATUS FOR $CO_2$ CONVERSION TO METHANE

[75] Inventor: Derek P. Gregory, Hinsdale, Ill.

[73] Assignee: SKF Industrial Trading and Development Company, Amsterdam, Netherlands

[22] Filed: Mar. 19, 1973

[21] Appl. No.: 342,506

Related U.S. Application Data

[62] Division of Ser. No. 223,546, Feb. 4, 1972, Pat. No. 3,766,027.

[52] U.S. Cl.................. 204/277, 204/246, 204/270, 260/449 M
[51] Int. Cl............................................... B01k 3/00
[58] Field of Search ............ 204/75, 246, 265, 270, 204/277, 72; 260/449 R, 449 M

[56] References Cited
UNITED STATES PATENTS

| | | | |
|---|---|---|---|
| 1,862,245 | 6/1932 | Stuart | 204/270 X |
| 2,749,293 | 6/1956 | Wahlin | 204/75 X |
| 3,607,687 | 9/1971 | Grangaard | 204/265 X |

Primary Examiner—John H. Mack
Assistant Examiner—W. I. Solomon
Attorney, Agent, or Firm—Molinare, Allegretti, Newitt & Witcoff

[57] ABSTRACT

A process of fixation and conversion of carbon dioxide from the atmosphere or other sources to produce methane and oxygen. Carbon dioxide is scrubbed from a $CO_2$-containing source and separated by process of chemical concentration. A special cell is provided in which hydrogen is produced and reacted with the separated $CO_2$ at methanation conditions to produce methane.

7 Claims, 1 Drawing Figure

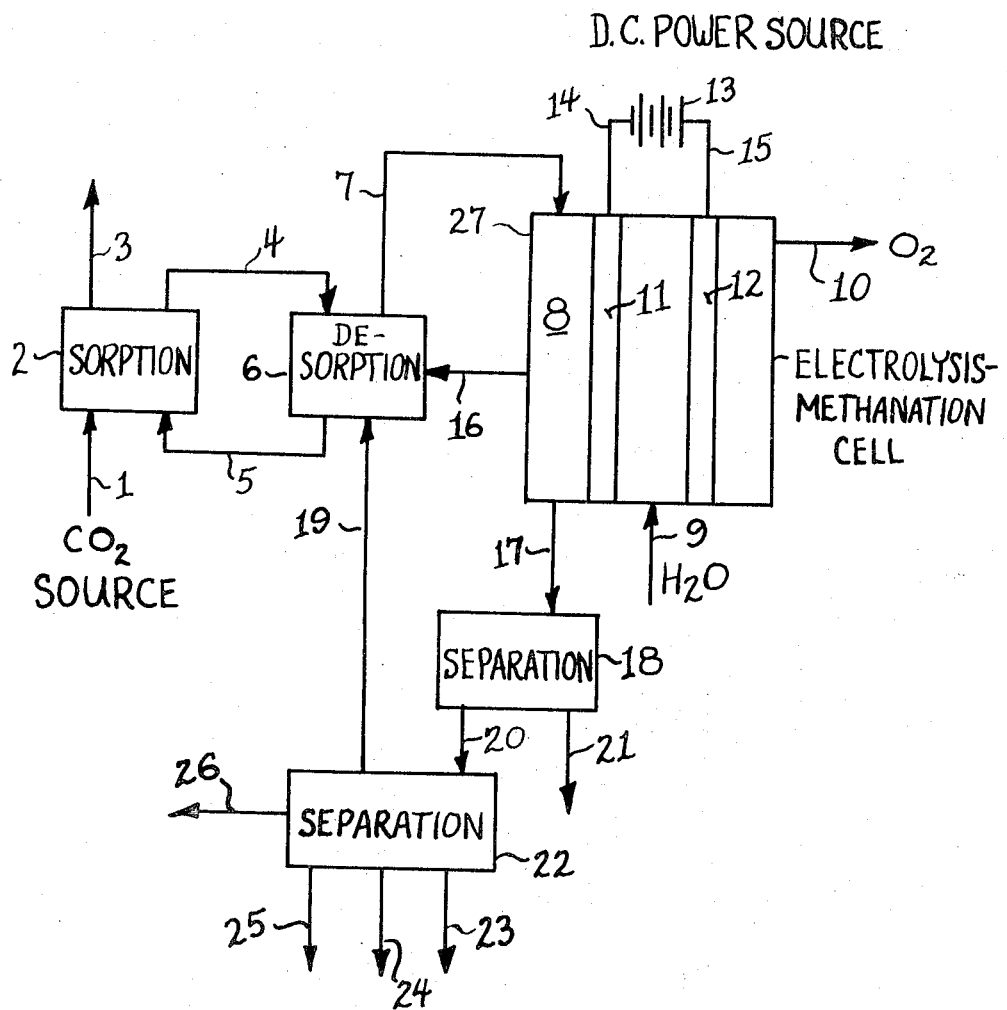

APPARATUS FOR CO₂ CONVERSION TO METHANE

This is a division of application Ser. No. 223,546, filed Feb. 4, 1972, now U.S. Pat. No. 3,766,027.

BACKGROUND OF THE INVENTION

This invention pertains to the recovery and conversion of carbon dioxide from air or other sources to produce a methane. More particularly, this invention pertains to a process of recovery of carbon dioxide from the atmosphere or other sources, followed by methanation of the $CO_2$ with hydrogen in a special electrochemical cell which combines the production of purge hydrogen with methanation.

Depletion of fossil hydrocarbons is occurring at increasingly rapid rates from two, competing needs of mankind. The major depletion is due to the use of fossil hydrocarbons as fuels which are burned. The competing use for the fossil hydrocarbons is for feed stocks for the organic chemical industry.

Thus, the depletion of the fossil hydrocarbons endangers not only the energy supplies, but also the basic building blocks for numerous end products, principally plastics, paints, solvents, drugs, pharmaceuticals, detergents, rubbers and the like.

In addition, as the fossil fuels are burned, the level of carbon dioxide in the atmosphere tends to rise. In turn, the increase in $CO_2$ content leads to heating the earth's surface as a result of the "greenhouse effect." In confined areas, such as submarines or spacecraft unless precautions are taken to prevent it, excessive carbon dioxide levels develop which are harmful to life.

THE INVENTION

OBJECTS

It is, therefore, an object of this invention to provide a process which can help to maintain the level of $CO_2$ in the atmosphere or other sources at an acceptable level, and convert it to methane as a basic fuel source of energy, and as a feed stock for industrial processes for production of a wide range of organic chemicals.

It is another object of this invention to recover carbon dioxide from the atmosphere or other sources such as combustion flue gases.

It is another object of this invention to conserve the world supply of fossil hydrocarbons as fuel and industrial process feed stocks.

It is another object of this invention to provide a process for the fixation of atmospheric or other carbon dioxide coupled with a process for production of hydrogen followed by methanation of the scavenged carbon dioxide.

Still other objects will be evident from the description of the invention which follows:

SUMMARY OF THE INVENTION

In the process of this invention, carbon dioxide is scrubbed from the atmosphere or other sources by a carbon dioxide absorber, from which the carbon dioxide is then liberated by regeneration with heat, and swept out of the regenerator with a stream of purge hydrogen or methane. The hydrogen is produced in a special electrolysis cell having an electrolyte compatible with $CO_2$ and operated at methanation conditions, with the hydrogen evolving electrode being fed with the $CO_2$ evolved from the regeneration stage of the absorber.

The conditions in the cell are controlled to produce methane. In turn this lowers hydrogen pressure and depolarizes the cell. The methanation zone of the cell is preferably in heat exchange relationship with the regeneration phase of the $CO_2$ absorber to provide the heat necessary for regenerating the $CO_2$ absorbing liquid.

The end product methane is recovered and may be utilized as a natural gas substitute, for example peak-shaving gas, but is also useful as a feed stock for the production of more valuable chemical compounds such as in reforming processes to produce carbon monoxide and hydrogen, or methanol, or other organic chemicals.

This process is particularly adaptable to the use of nuclear energy to provide the electricity for the electrolyzer, and thus this process provides a ready source for methane fuel and feed stocks as fossil hydrocarbons become more scarce.

Detailed description of the preferred embodiment follows having reference to:

The FIGURE which is a schematic representation of the process of this invention.

The detailed description and preferred embodiment are by way of illustration and not by limitation, it being understood that variations in the invention may be employed without departing from the spirit thereof.

DETAILED DESCRIPTION OF THE PREFERRED EMBODIMENT

The normal carbon dioxide levels in the earth's atmosphere are in the range of 300 to 500 ppm (0.03 – 0.05 percent by volume) with oxygen being present in the range of 20 to 21 percent. The carbon dioxide scrubbed from the air must be relatively free from oxygen since it is to be reacted with hydrogen at relatively high temperatures. These conditions present the possibility of combustion of any residual oxygen and hydrogen, and must be prevented. Accordingly, our process employs carbon dioxide "relatively free of oxygen" which refers to maintaining the oxygen concentration below the explosive limits of the carbon dioxide-hydrogen mixture produced for reaction in the methanation stage of this process. The carbon dioxide produced in accord with our process thus contains less than about 15 percent oxygen. In order to reduce the wasteful loss of hydrogen by reaction with this residual oxygen on the catalyst, it is preferred to keep the oxygen concentration to a minimum.

Although nitrogen contamination is not a critical problem since it is relatively inert at the subsequent methanation conditions, it is preferred to keep the nitrogen concentration to a minimum to avoid adverse dilution effects in the methanation processing stage.

In the first step of the process in accord with this invention, carbon dioxide is separated from air or other sources such as combustion process flue gases by any conventional means such as cryogenic fractional distillation, semi-permeable membrane separators, or selective chemical sorption.

It is preferred in this invention to use the chemical techniques utilizing carbon dioxide selective materials since they generally work at relatively low pressures and ambient temperatures, and the concentration of carbon dioxide in the air is relatively small. For cryogenic fractional distillation and the semi-permeable membrane separators, vast quantities of air must be either compressed or moved against pressure differentials in order to effect separation which is expensive in terms of energy.

The chemical sorption processes are relatively inexpensive in terms of energy requirements, and are particularly suitable since most can be regenerated. Suitable carbon dioxide selective chemical sorbents include solids such as molecular sieves, and liquids such as aqueous solutions of sodium hydroxide, potassium hydroxide, sodium carbonate, potassium carbonate, and organic liquids such as mono-, di-, and tri-ethanol amines, diamines, isopropanol, and mixtures thereof. A preferred sorbent used in this invention is monoethanolamine.

The exact conditions at which carbon dioxide is to be sorbed varies with a given sorbent. Temperatures in the range of 0°F to 750°F, depending on the sorbent, may be employed. In the particular instance of monoethanolamine, air and liquid amine are countercurrently contacted at a temperature in the range of from about 50°F to 200°F, preferably 100°F to 120°F. Other $CO_2$ absorbing processes may be used, particularly the "Purasol" process using a methyl-2-pyrrolidene sorbent, or the "Rectasol" process using methanol at low temperatures as a solvent.

Unlike the usual prior art problem of air-scrubbing which has been faced for example in connection with alkaline fuel cell input stream scrubbing, it is not necessary to remove all of the $CO_2$ from the input air. Rather, in the process of this invention, as much carbon dioxide as possible is extracted in the absorber, and to regenerate the absorber in a highly concentrated form without contamination by oxygen. The process of this invention works essentially in the reverse of the usual scrubbing process in that the air exhausting from the scrubber is not used in any process but is ejected back to the atmosphere unused, whereas the fixed carbon dioxide absorbed by the scrubber absorbent is then recovered and utilized as the process gas stream. Whereas in prior art processes it is not important as to the type of purge gas used to desorb the carbon dioxide from the absorbent material, this becomes critical in our process since oxygen contamination with the carbon dioxide in a concentration within the combustion limits of the subsequent carbon dioxide-hydrogen mixture leads to dangerous conditions.

In the process of this invention, the carbon dioxide-laden sorbent is regenerated by the combination of a gaseous desorbent purge and heat. The heat is provided by heat exchange with the exothermic methanation zone of the special cell, which is described in more detail below. It is preferred to regenerate the sorbent such as monoethanolamine containing the carbon dioxide absorbed therein by contacting the $CO_2$-laden sorbent with hydrogen or a mixture of hydrogen and methane since these compounds are present in the methanation zone in the special cell, and need not be separated from the carbon dioxide before that subsequent processing. In addition, the hydrogen in this process, being derived from an electrolytic cell is substantially oxygen free and will not introduce contaminant oxygen to the carbon dioxide.

As with the sorption, suitable regeneration (desorption) conditions vary with the sorbent. Temperatures vary with the sorbent used, and are generally higher than the sorption step, generally in the range of from 100°F to 1,000°F. In the particular instance of the preferred sorbent, monoethanolamine, temperatures in the range of from about 250°F to 400°F, preferably 300°F to 350°F, and liquid to purge gas, for example, hydrogen, volume ratios of $4H_2$ to $1CO_2$ are desirable to produce a stoichrometric mixture for methane production.

Hydrogen is obtained relatively free of oxygen by the electrolysis of water in an acid electrolysis zone utilizing suitable acid electrolytes. Like the carbon dioxide, the hydrogen must be relatively free of oxygen (below the combustion limit). Preferably the hydrogen contains less than 2 percent by volume $O_2$.

The by-product oxygen formed by the electrolysis step has utility in a broad application of industrial processes such as steel production, advanced sewage treatment, and water recycling processes.

The desorbent stream coming from the desorption zone is then passed into a methanation zone in the cell wherein the conditions are adjusted for a methanation reaction between carbon dioxide and hydrogen to produce methane and water vapor. The water vapor is subsequently separated from the methane stream and the methane end product is utilized as above described. This methanation reaction is an exothermic one and the heat evolved is recovered by conventional heat exchange means and utilized to supply heat to the regeneration stage of the $CO_2$ scrubber to desorb the carbon dioxide from the chemical sorbent.

The methanation reaction between carbon dioxide and hydrogen is a known and established process and produces as products methane and water as well as carbon monoxide, an intermediate in the reaction. The methanation reaction product can be separated to produce a pure methane stream and the excess hydrogen and/or carbon dioxide if any, recycled. Similarly, carbon monoxide, if present, may be recycled to the reaction zone or withdrawn as a separate product steam for conversion to other chemicals such as methanol.

In more detail, the electrolysis reaction and methanation reaction are combined in an electrolysis cell compatible with carbon dioxide to produce the methane in a single step. Suitable electrolytes for such an electrolysis cell include mineral acids, such as phosphoric acid, carbonates such as alkali metal carbonates ($Li_2CO_3$, $K_2CO_3$ and $Na_2CO_3$), and solid oxide electrolytes such as a stabilized zirconia. The cell is operated at conditions under which methanation takes place, for example in a temperature range of about 250°F to 2,000°F, preferably 400°F – 1,000°F, with the hydrogen evolving electrode being fed with the carbon dioxide. It may be preferable to operate a cell under pressure to prevent evaporation of electrolyte at these temperatures. The hydrogen is converted immediately upon evolution at the electrode, which results in lowering the hydrogen partial pressure and depolarizing the cell. Further, the heat released in the methanation reaction will lower the cell voltage and decrease the electrical energy input required.

In this single stage process, a reaction product comprising methane and water will be produced along with intermediate products such as carbon monoxide and unconverted hydrogen and/or carbon dioxide. At least a portion of the methane so produced, before or after further separation, is preferably utilized to purge or regenerate the carbon dioxide containing sorbent utilized in the air separation step to recover the carbon dioxide for conversion in the combination electrolysis-methanation cell.

The overall reaction in the methanation electrolysis cell may be represented as follows:

$$4H_2O(l) + CO_2(g) \rightarrow CH_4(g) + 2H_2O(g) + 2O_2(g);$$
$$\Delta H = +233.7 \text{ Kc al} \qquad (1.)$$

This represents an energy saving of about 14 percent over a two-step process involving hydrogen production and methanation in separate zones. Further, in another embodiment of this invention, the heat generated by electrolysis inefficiency is recovered and used as heat in the carbon dioxide desorption step.

OPERATION OF THE PROCESS

The FIGURE shows in schematic diagram form the fixation of carbon dioxide from the atmosphere or any other convenient source, and the production of methane therefrom by reaction with electrolytic hydrogen in a single stage. Miscellaneous appurtenances are eliminated from the FIGURE with only those lines and zones necessary for a complete and clear understanding of the process of the present invention being illustrated and discussed.

Referring to the FIGURE, a gas, such as air, containing about 400 ppm carbon dioxide is passed into absorption zone 2 via line 1 where the carbon dioxide is selectively sorbed on a carbon dioxide selective sorbent material. For example, the gas is cocurrently or countercurrently bubbled through liquid monoethanol amine entering zone 2 via line 5. The sorption is maintained at temperatures substantially in the range of from 50°F to 200°F. The carbon dioxide-depleted gas is exhausted from the sorption zone 2 via line 3 and discharged to the atmosphere. The $CO_2$-saturated sorbent material is passed into desorption zone 6 via line 4. Fresh sorbent material enters zone 2 via line 5 from the desorption zone as described in more detail below.

In desorption zone 6, the carbon dioxide contained in the selective sorbent is removed by purging with a hereinafter described methane or hydrogen-containing stream entering via line 19 to produce a regenerated carbon dioxide selective sorbent which is removed via line 5 for passage to sorption zone 2. The resultant methane-carbon dioxide mixture is removed from desorption zone 6 via line 7, and passed to electrolysis-methanation zone 8.

The desorption zone is maintained at a temperature in the range of from about 250°F to 400°F by heat exchange 16 with the special electrolysis-methanation zone 8. The hydrogen or methane-containing gas purges the carbon dioxide-containing desorbent regenerating it for recycle to the sorption zone 2 via line 5. As illustrated, sorption zone 2 and desorption zone 6 are separate zones, however, in a commercial embodiment these separate zones may be contained within a single zone.

The special electrolysis-methanation zone 8 is part of an electrolysis cell, e.g., an acid electrolysis cell operating at from 250°F to 450°F, wherein water entering via line 9 is electrolyzed by cathode 11 and anode 12 to produce hydrogen and oxygen respectively. The negative current for cathode 11 is preferably provided by a nuclear powered DC power source 13 via line 14. Similarly, the positive current for anode 12 is provided by line 15. Within electrolysis-methanation zone 8, the carbon dioxide contained within line 7 is contacted with the hydrogen as it is evolved from cathode 11, thereby effecting an almost simultaneous conversion of the carbon dioxide and hydrogen to methane. A portion of the carbon dioxide and hydrogen may be converted to carbon monoxide under the methanation zone conditions, but this can be converted to methane if desired. Oxygen evolved by anode 12 is removed from electrolysis zone 8 via line 10 for further industrial uses.

The reaction product from methanation zone 8 comprising methane, water vapor, unconverted hydrogen, if any, unconverted carbon dioxide, if any, and intermediate product carbon monoxide, if any, are removed via line 17 and passed to separation zone 18 wherein water is removed via line 21 as above described. This is substantially pure and may be recycled to electrolysis cell via line 9 in one embodiment of our process. A relatively water-free mixture containing the gas enumerated just above is removed from separation zone 18 via line 20. This product gas mixture may be further processed in separation zone 22 to provide a recycle hydrogen stream 23, a recycle carbon dioxide stream 24, a recycle or product CO stream 25 and a product methane stream 26. Any one or more of the CO, $H_2$, and/or $CO_2$ streams 25, 23, 24 may be recycled directly to the desorption zone 6 via line 19, to assist in the purge, or passed into the methanation zone 8 via lines 7 or 27 for reaction.

The carbon monoxide present in the stream 17 exiting from the methanation zone is due to only partial reaction of the carbon dioxide with the hydrogen. This carbon monoxide stream can be recycled to the methanation zone via lines 7 or 27 to complete its reaction. In addition, the methane in line 17 may be separated from the mixture of other gases and these other gases, carbon monoxide, hydrogen and residual $CO_2$ recycled as a combined stream back to the desorption or the methanation zones as above described. Likewise, a portion of the methane may be used to purge the desorption zone 6. Where desired, the carbon monoxide may be used directly as a product stream such as for example in the production of methanol or carbon black.

From the foregoing description it is readily seen by those skilled in the art that there has been provided a process which can readily fix and convert atmospheric carbon dioxide and electrolytic hydrogen to methane in a special cell. This process offers a method for removing carbon dioxide, from the atmosphere and producing a highly useful chemical, methane, which can be used as a fuel or converted to other chemicals and thus conserve our fossil hydrocarbon fuel supply.

It should be understood that while reference has been made to atmospheric air as one source of $CO_2$, any convenient $CO_2$ source may be used. For example, some process flue gas streams, for example power plant combustion processes may be relatively rich in $CO_2$, and thus could be used as the $CO_2$ source. Many other variations in the scope of the process of this invention may be made without departing from the spirit thereof.

I claim:

1. An apparatus for simultaneous electrolysis of water and methanation of $CO_2$ comprising in combination:
   a. a housing,
   b. an external DC power source,
   c. a cathode and an anode disposed in said housing connected to the external DC power source, said cathode being adapted to electrochemically evolve hydrogen therefrom, d. said anode and cathode adapted to have an electrolyte disposed between them and e. means for supplying water to said electrolyte, f. means for separating $CO_2$ from a gas stream containing $CO_2$ to produce a $CO_2$ containing gas stream relatively free of oxygen, g. means for supplying said $CO_2$ stream to said cathode, to exothermically produce methane, and h. means for exhausting a methane-containing product gas from said cathode.

2. An apparatus as in claim 1 which includes means for exhausting oxygen from said anode.

3. An apparatus as in claim 1 which includes means for maintaining said electrolyte and said cathode in a temperature range of from about 250°F to 2,000°F.

4. An apparatus as in claim 3 wherein said temperature maintaining means includes heat exchange means for transfer of heat from said electrolyte and/or said cathode to said $CO_2$ separation means.

5. An apparatus as in claim 1 wherein said $CO_2$ separation means includes:

a. means for contacting the $CO_2$ containing gas stream with a carbon dioxide selective sorbent to produce a $CO_2$ containing sorbent relatively free of oxygen; and, b. means for contacting the $CO_2$ containing sorbent with a relatively $O_2$ free gaseous stream to remove $CO_2$ from said sorbent and produce an $O_2$ free, $CO_2$ containing gas stream.

6. An apparatus as in claim 5 which includes means for transferring heat from said electrolyte and/or said cathode to said $CO_2$ separation means to remove said $CO_2$ from the sorbent.

7. An apparatus as in claim 5 which includes means for passing a portion of said methane containing products gas to said $CO_2$ separation means to remove $CO_2$ from said sorbent.

* * * * *

PO-1050
(5/69)

UNITED STATES PATENT OFFICE
CERTIFICATE OF CORRECTION

Patent No. 3,852,180     Dated December 3, 1974

Inventor(s) DEREK P. GREGORY

It is certified that error appears in the above-identified patent and that said Letters Patent are hereby corrected as shown below:

THE ASSIGNEE SHOULD BE:

INSTITUTE OF GAS TECHNOLOGY
    CHICAGO, ILLINOIS

Signed and sealed this 13th day of May 1975.

(SEAL)
Attest:

RUTH C. MASON
Attesting Officer

C. MARSHALL DANN
Commissioner of Patents
and Trademarks